United States Patent

Kirma

Patent Number: 5,814,763
Date of Patent: Sep. 29, 1998

[54] CLAMP FOR SECURING A FLEXIBLE PROTECTION HOSE TO AN ELECTRICAL CONNECTOR, ESPECIALLY IN AN AIRCRAFT

[75] Inventor: Safa Kirma, Wedel/Holstein, Germany

[73] Assignee: Daimler-Benz Aerospace Airbus GmbH, Hamburg, Germany

[21] Appl. No.: 802,888

[22] Filed: Feb. 18, 1997

[51] Int. Cl.⁶ ............................ H02G 3/26
[52] U.S. Cl. ............................ 174/40 CC
[58] Field of Search ............ 174/40 CC; 248/231, 248/71, 74.2; 24/20 R, 22, 23 R, 24

[56] References Cited

U.S. PATENT DOCUMENTS

| | | | |
|---|---|---|---|
| 2,382,678 | 8/1945 | Tinnerman | 174/40 CC |
| 3,891,294 | 6/1975 | Philibert | 24/20 |
| 4,380,096 | 4/1983 | Nishida et al. | 24/20 R |
| 4,609,171 | 9/1986 | Matsui | 248/74.3 |
| 4,622,719 | 11/1986 | Rasmussen et al. | 24/20 R |
| 4,773,129 | 9/1988 | Muhr | 24/20 R |
| 4,858,279 | 8/1989 | Kato et al. | 24/20 R |
| 5,018,987 | 5/1991 | Kirma | 439/445 |

FOREIGN PATENT DOCUMENTS

| | | |
|---|---|---|
| 203451 | 10/1983 | Germany . |
| 3432302 | 3/1985 | Germany . |
| 9017012 | 5/1991 | Germany . |

*Primary Examiner*—Kristine L. Kincaid
*Assistant Examiner*—Joseph Waks
*Attorney, Agent, or Firm*—W. G. Fasse; W. F. Fasse

[57] ABSTRACT

A clamp for securing a protection hose to an electrical connector is formed as a cuff with a longitudinal gap. The cuff has an inherent bias which normally tends to close the gap. The cuff is provided with tool insertion elements for widening the gap to insert the protection hose into the cuff. When a tool is released the inherent bias generates force components so directed that the cuff will clamp the hose between the connector and the cuff. The tool insertion elements may also be used for electrically grounding the cuff made of electrically conducting material.

18 Claims, 3 Drawing Sheets

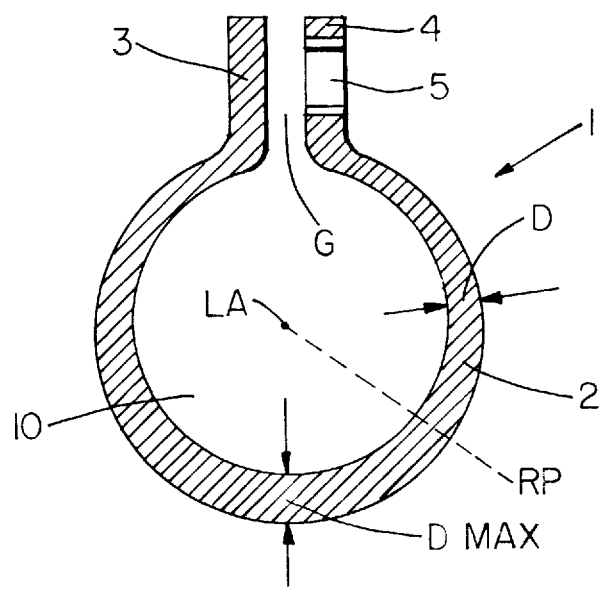
FIG. 1
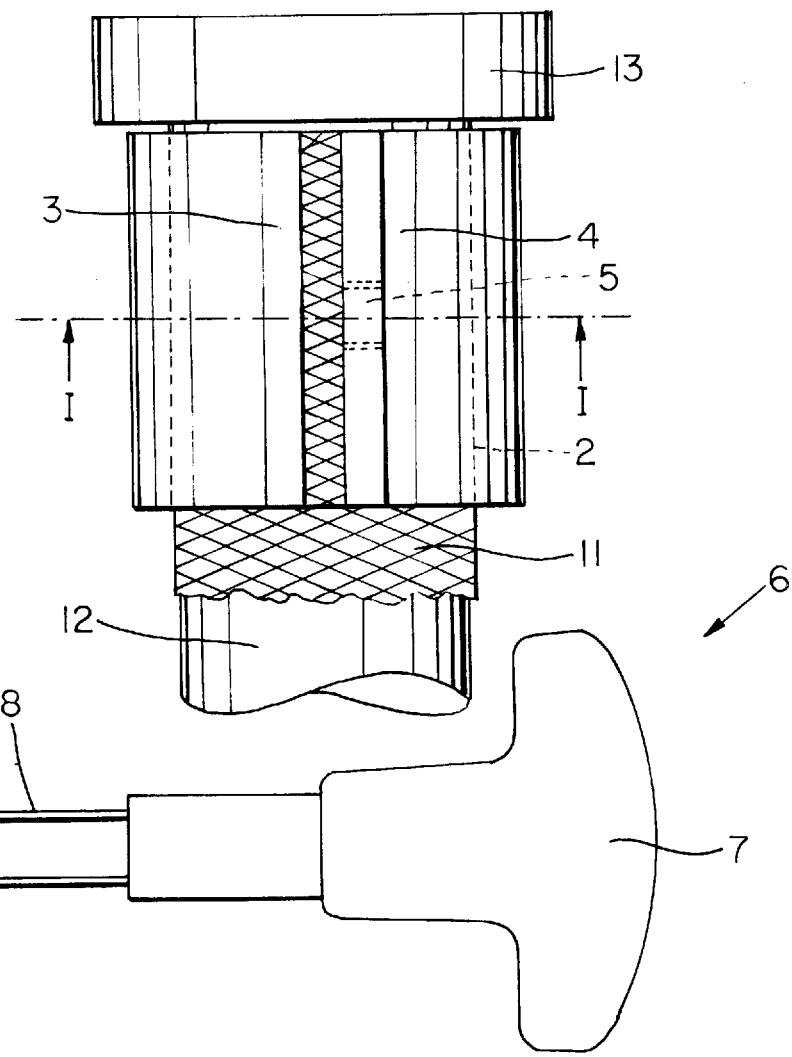
FIG. 2
FIG. 3

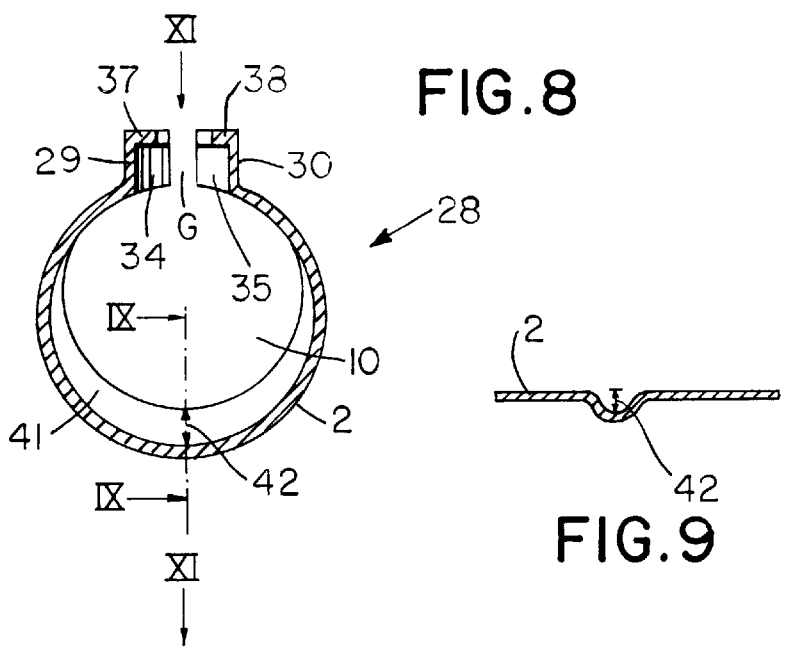
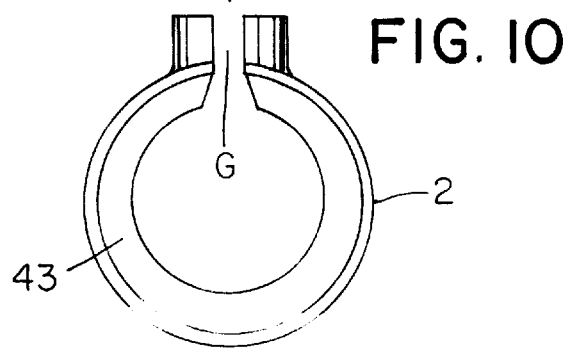
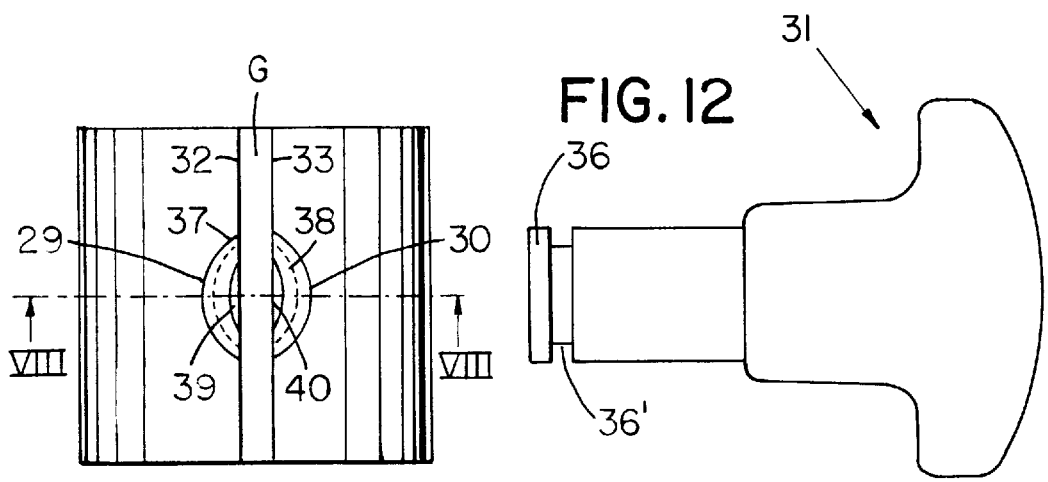
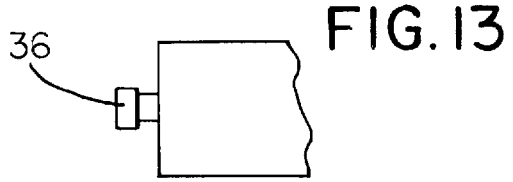

CLAMP FOR SECURING A FLEXIBLE PROTECTION HOSE TO AN ELECTRICAL CONNECTOR, ESPECIALLY IN AN AIRCRAFT

FIELD OF THE INVENTION

The invention relates to a hose clamp that secures a flexible protection hose to an electrical connector or the like by an inherent biasing force that must be overcome to initially place the clamp over the protection hose.

BACKGROUND INFORMATION

In order to assure a safe grounding of excessive currents caused by lightning or to provide protection against interaction, e.g. magnetic field interaction in electrical systems in an aircraft, it is necessary that flexible protection hoses such as wire mesh hoses e.g. made of copper wire mesh are effectively secured to the cable connectors, plug-in connectors, and the like, while simultaneously providing a grounding connection. The securing of the flexible hoses with the clamps must also take up all mechanical loads to which the cables and wiring may be exposed in an aircraft.

It is known to secure the protection hoses by hose clamps having a clamping band or strip, whereby the protection hoses are integrated into the lightning protection system of the aircraft. However, conventional hose clamps have a tendency to damage individual strands of the wire mesh hose. The damage occurs under the clamping band and hence is not visible without removing the clamp. It is important to avoid such damage because it reduces the available cross-sectional current flow area of the protection hose, whereby the proper grounding of a lightning induced current may be impaired.

It is also known to secure wire mesh metal hoses by crimping bushings. However, the crimping force also has a tendency to also damage individual mesh strands. Besides, it is not possible to remove a crimped bushing without destroying it. Further, the crimping pressure can even damage the internal support body in addition to damaging the mesh strands by causing so-called flowing of the strands if they are made of copper, whereby again the available cross-sectional current flow area is diminished. As a result, it is difficult to satisfy the safety requirements to be met by an aircraft wiring by crimped connections of the wire mesh protection hoses to the cable connectors and other components of the wiring system. Another disadvantage of crimped connections is seen in that a special tool is required that can be used conveniently only in the factory, but not on location where the wiring system is to be installed, repaired, or replaced.

It is also known to simply hold down the protection hoses by manually applying a tape around the hose ends. However, the resulting tape sleeves do not provide the pressure required for achieving a low electrical transition resistance between the protection hose and the component to which the protection hose is connected. Such low transition resistance however is important in a lightning protection system, especially in an aircraft, to assure the proper grounding of excess currents.

It is also known to wind a tape around the hose ends with a tool that permits adjusting the tape pulling force. However, an operator may adjust the pulling force too high or too low having in mind the need for different pulling forces for different types and sizes of connector elements. In order to take these uncertainties into account, at least two bandage layers of tape are applied which makes this approach even more cumbersome.

German Utility Model Publication G 90 17 012.1 (Deutsche Airbus), published on May 23, 1991, discloses form bodies of various shapes for securing flexible metallic protection hoses with the help of a hose clamp provided with clamp extension lugs through which a screw passes for tightening the clamp around a form body. Each form body comprises two half-shells that can be attached to the protection hose without the need of threading the hose through the clamp.

East German Patent Publication 203,451 (Turinsky et al.), published on Oct. 19, 1983, discloses a screening for plug-in connectors. The screening is made as a heat shrinkable electrically conducting hose material that is applied to the plug-in connector sections and then heat shrunk in place to form a tight envelope that may be opened and thereby destroyed by a rip wire. The electrically conducting screening material provides electric continuity between the protection hose of one cable and the protection hose of the other cable interconnected with the first mentioned cable by the plug-in connector. Contact enhancing rings may be secured around the envelope of the heat shrunk screening material. German Patent Publication DE 3,432,302 A1 (Matsui), published on Mar. 21, 1985, discloses a shell-type clip for holding electrical insulated wires or cable bundles in place. An elastic bail with a snap-in edge engages a groove to close the clip around a wire bundle or cable.

OBJECTS OF THE INVENTION

In view of the above it is the aim of the invention to achieve the following objects singly or in combination:

to provide a hose clamp that is simple in its structure, yet capable of satisfying the strict safety requirements that must be met by electrical wiring systems in an aircraft;

to construct the hose clamp in such a way that it is consistently reliable even under operating conditions where the clamp connection is exposed to vibrations and impacts;

to consistently assure the required contact pressure between the clamp and the protection hose uniformly around the circumference of the hose to provide the low electrical transition resistance required for an effective lightning protection system of the wiring in an aircraft;

to make sure that achieving the uniform contact pressure does not damage any of the strands of the wire mesh protection hose nor any connector part; and to construct the clamp in such a way that it is easily installed and replaced or exchanged in a wiring system, particularly in an aircraft.

SUMMARY OF THE INVENTION

A clamp for securing a flexible hose to an electrical connector or the like especially for use in an aircraft is characterized according to the invention by a clamp wall forming a cuff having a longitudinal axis and longitudinal edges extending in parallel to each other and in parallel to the longitudinal axis in the clamp wall. The longitudinal edges substantially face each other to form a longitudinal gap between these edges at least when a force is applied to move these edges away from each other. The clamp wall forming the cuff has an inherent biasing spring force component directed to tend to close the gap. Preferably, the spring force is effective radially inwardly relative to the longitudinal axis for biasing the longitudinal edges toward each other to close the clamp to an inner cuff diameter tightly fitting onto an outer diameter of the protection hose when the cuff is installed on the hose. Several embodiments of the present clamps include different elements for applying a gap widening force to the cuff to thereby temporarily increase the inner cuff diameter against the biasing spring force component for inserting the protection hose into the cuff, whereby the biasing force clamps the cuff onto the outer diameter of the protection hose when the gap widening force is released.

In one embodiment the gap widening force is applied by a screw passing through a threaded hole in one flange of the cuff and bearing against the opposite flange of the cuff. Once the clamp is in place and the screw removed, the threaded hole may be used as a connection for a grounding device.

In another embodiment in which the cuff is formed by a rolled-up spring, openings are provided for the insertion of a spreader tool to apply the gap widening force. These openings are preferably positioned centrally or midway between the ends of the cuff and near the longitudinal edges forming the gap. Such a gap is preferably formed even if a portion of a turn of the rolled-up spring passes through the gap. Preferably, the openings are formed in lugs secured in the just described position midway between the ends of the cuff next to the longitudinal edges thereof. The openings are preferably through-holes. In both instances the lugs may be used as grounding connectors.

In a third embodiment the elements for applying a gap widening force comprise two half shells facing each other and secured near the longitudinal edges, preferably midway between the ends of the cuff. The half shells permit the insertion of a cam type tool between the shells which upon rotation increases the distance between the half shells, thereby widening the inner diameter of the cuff for insertion of the protection hose. After insertion of the hose the tool is removed. The half-shells may also serve as grounding connectors.

BRIEF DESCRIPTION OF THE DRAWINGS

In order that the invention may be clearly understood, it will now be described, by way of example, with reference to the accompanying drawings, wherein:

FIG. 1 is a sectional view through a first embodiment of a clamp formed as a cuff with two flanges according to the invention along section line I—I in FIG. 2, whereby FIG. 1 omits the electrical connector and wire mesh hose;

FIG. 2 is a plan view of the clamp according to FIG. 1, however also showing schematically an electrical connector section and a wire mesh protection hose on a cable;

FIG. 3 illustrates a tool for applying a gap widening force to the flanges of the hose clamp of FIG. 1;

FIG. 8 illustrates a sectional view through a third clamp embodiment with a cuff having two half-shells secured to the cuff for applying a gap widening force to the clamp preferably also having at least one reinforcing corrugation groove;

FIG. 9 is a sectional view along section line IX—IX in FIG. 8 to further illustrate the corrugation groove;

FIG. 10 is an end view onto a clamp with a modified reinforcing corrugation groove;

FIG. 11 is a plan view in the direction of the arrow XI in FIGS. 8 or 10; and

FIGS. 12 and 13 show a tool for applying a gap widening force to the half shells of the clamp according to the third embodiment.

Figure 4:
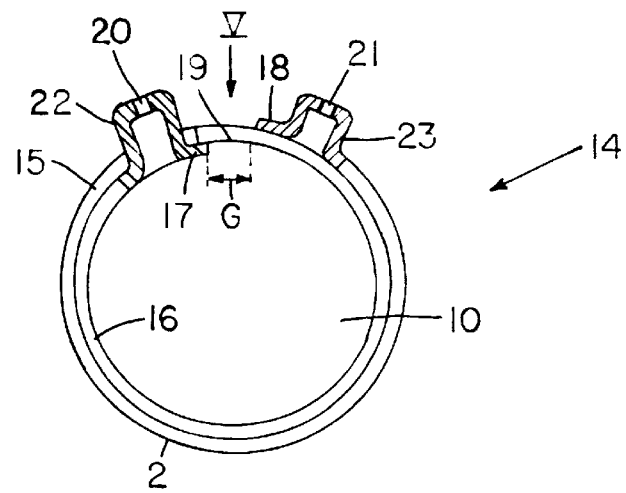
FIG. 4 is an end view in the axial direction of a second clamp embodiment according to the invention with a cuff formed of a rolled-up spring having more than one but less than two full turns.

DETAILED DESCRIPTION OF PREFERRED EXAMPLE EMBODIMENTS AND OF THE BEST MODE OF THE INVENTION

FIGS. 1, 2, and 3 illustrate a first clamp embodiment of the invention. A clamp 1 has a clamp wall that forms a cuff 2 with a wall thickness D preferably that varies around the cuff. Two flanges 3 and 4 extend, preferably in parallel to each other, from the cuff 2. These flanges form longitudinal edges that face each other across a gap G. One of the flanges, for example 4 has a threaded hole 5 for the application of a gap widening tool shown in FIG. 3. The clamp wall forming the cuff 2 has a rectangular cross-section in a radial plane RP. The area of the cross-section varies in its cross-sectional size in accordance with the varying wall thickness D. The cuff 2 has a longitudinal axis LA and the flanges 3 and 4 extend in parallel to the longitudinal axis LA, whereby the longitudinal gap G between the edges or inwardly facing surfaces of the flanges 3, 4 also extends in parallel to the axis LA. The threaded hole 5 forms an element for applying a gap widening force for overcoming the inherent biasing spring force in the cuff 2. For this purpose a screw 6 preferably formed with a handle 7 and a threaded shank 8 is screwed into the hole 5, whereby the free end 9 of the shank 8 bears against the inwardly facing wall of the flange 3 to thereby push the two flanges apart and temporarily widen the inner diameter of the cuff 2. The inherent biasing force is so directed that it tends to narrow the gap, thereby making the diameter of the substantially circular clamp opening 10 smaller when the tool or screw 6 is removed.

When the free end 9 of the screw shank 8 bears against the inwardly facing wall of the flange 3, the diameter of the opening 10 is widened, whereby a protective hose 11 surrounding a cable or wire or wire bundle 12 can be inserted into the opening 10 while a coupling or other connector element 13 is inserted into the wire mesh 11, whereupon the tool can be unscrewed and the clamping connection is automatically completed. The threaded hole 5 can now be used for connecting a grounding member to the cuff 2 for electrical grounding of the wiring system.

Referring to FIG. 1, the wall thickness D of the cuff 2 preferably varies in such a manner that the thickest wall portion $D_{MAX}$ is located opposite the gap G and the thinnest wall portions are located next to the gap G where the cuff 2 merges into the flanges or edges 3, 4. As a result, the thickest wall portion $D_{MAX}$ is positioned where the gap widening force exerted by the tool 6 produces the largest bending moment. This construction of the cuff 2 makes sure that the cuff has a uniform bending resistance around the cuff from one flange 3 to the other flange 4 relative to the gap widening force. Stated differently, the bending resistance of the cuff 2 will increase corresponding to the increasing bending moment away from the flanges 3 and 4 toward the thickest wall portion $D_{MAX}$ opposite the gap G. As a result, the inherent biasing spring force component is also uniform around the cuff to form the substantially circular opening 10, whereby the biasing forces are so directed that a uniform contact pressure is exerted by the inner surface of the cuff 2 all around the wire mesh 11, thereby keeping any electrical transition resistance from the wire mesh 11 through the electrically conducting cuff 2 to a grounding connector in the threaded hole 5 optimally small.

Figure 5:
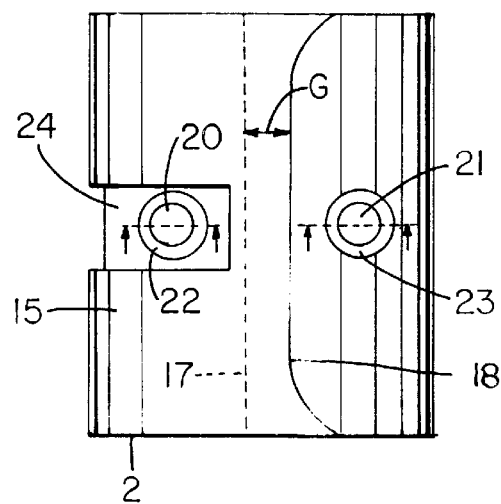
FIG. 5 is a plan view of the clamp of FIG. 4 in the direction of the arrow V in FIG. 4.
Figure 6:
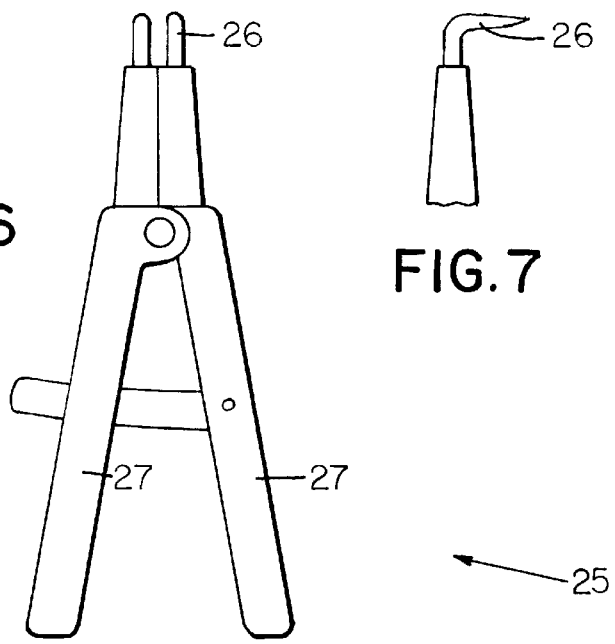
FIGS. 6 and 7 show a tool for applying a gap widening force to the clamp.
Figure 7:
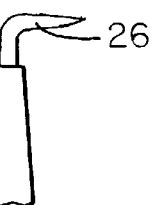

FIGS. 4 and 5 show a second embodiment of a clamp 14 according to the invention wherein the cuff 2 is formed by a rolled-up spring having at least one incomplete turn 15, preferably more than one incomplete turn 15 and 16, whereby the turn has or turns have free longitudinal edges 17 and 18 still substantially facing each other, however somewhat radially displaced relative to each other to form the gap G, whereby a portion 19 of a rolled-up spring turn passes through the gap G.

Two tool insertion openings 20 and 21 preferably formed in lugs 22, 23 respectively, are provided for the insertion of tips 26 of a tool 25 to widen the gap G and thereby increasing the diameter of the opening 10. The two openings 20 and 21 are positioned approximately midway between the ends of the cuff 2 formed by the spring turns and near the longitudinal edges 17 and 18 of the spring turns opposite each other for insertion of the gap widening tool 25 constructed so that the tips 26 move away from each other when the handles 27 are moved toward each other.

Preferably, the openings 20 and 21 provided in the lugs 22 and 23 respectively, are through-holes whereby the lugs are preferably hollow to permit proper insertion of the prongs or tips 26. In order to provide access for the tool to the opening 20 a window or cutout 24 is provided in the outer turn 15 as best seen in FIG. 5. The cutout 24 passes through the outer and any intermediate turns to provide proper access for the tool.

When the cuff 2 comprises more than one turn, the free edges 17 and 18 are radially displaced relative to each other and a portion 19 of the rolled-up spring turn passes through the gap G. One of the longitudinal edges 18 is positioned radially outwardly of the spring turn portion 19 while the other of the longitudinal edges 17 is positioned radially inwardly of the spring turn portion 19. The cutout or window 24 is so positioned midway between the ends of the cuff 2 next to the edge 17 that the opening or lug is readily accessible for the tool prongs 26. The window 24 will extend through all turns except the innermost turn to assure the required access. The other opening 21 is directly accessible without a window.

The inherent biasing spring force component is so directed that it causes the at least one or more than one incomplete rolled-up spring turns to curl up in a sense to narrow the gap or even to eliminate the gap altogether when the free edges 17 and 18 overlap each other. In such a construction the gap would only be formed when the tool spreads the lugs 21 and 22 away from each other to increase the diameter of the opening 10 sufficiently for the insertion of the wire mesh protection hose 11.

Referring to FIGS. 8 to 13 in conjunction, a third embodiment comprises a clamp 28 forming a cuff 2 of sheet metal as a substantially cylindrical body having secured thereto two half-shells 29 and 30 forming elements for temporarily applying a gap widening force with a tool 31 shown in FIGS. 12 and 13. The half-shells are positioned opposite each other across the gap G and may be integral parts of the respective free edge of the tool longitudinal edges 32, 33 facing the gap G. The half-shells 29 and 30 form curved cam surfaces 34 and 35 for cooperation with the tool 31 or rather with a rectangularly shaped cam end 36 of the tool 31. The half-shells 29 and 39 are partly covered by cover sections 37, 38 which have a curvature conforming to the respective curvature of the corresponding half shell 29, 30, thereby leaving curved cutouts 39 and 40 between the covers facing the gap for the insertion of the cam end 36 of the tool.

In operation, a groove 36' of the tool will engage the cover sections 37 and 39 when the tool 31 is inserted with its cam end 36 into the gap G. When the tool is rotated the longitudinal edges 32, 33 are forced apart, thereby widening the gap and increasing the inner diameter of the opening 10 for the insertion of the protection hose 11, whereupon the tool is further rotated to align the narrow width of the cam end 36 of the tool 31 with the gap for withdrawal of the tool The engagement of the groove 36' by the cover sections 37 and 38 prevents the inserted tool from slipping out of the half-shells.

As shown in FIGS. 8 and 10, the cuff 2 has a uniform wall thickness. However, in the embodiment of FIG. 8 a corrugation groove 41 strengthens the cuff 2 in such a way that the largest resistance against bending is provided where the largest bending moment is applied by the tool 31, namely opposite the gap G. At this point the groove 41 has its largest radial depth 42 as shown in FIGS. 8 and 9. The radial depth 42 of the groove 41 diminishes toward the longitudinal edges 32, 33.

In the embodiment of FIG. 10 a different corrugation groove 43 is formed with a uniform groove depth throughout the length of the groove around the cuff 2.

The bending resistance in the embodiment of FIG. 8 is uniform in the sense that the bending resistance increases uniformly with the increasing bending moment that becomes larger the larger the distance from the force application to the respective point of the cuff 2, namely opposite the gap G.

Incidentally, the half-shells 29 and 30 after removal of the tool 31 may also be used as connectors for a grounding cable or the like.

Although the invention has been described with reference to specific example embodiments, it will be appreciated that it is intended to cover all modifications and equivalents within the scope of the appended claims.

What is claimed is:

1. A clamp for securing a flexible protection hose to an electrical connector, said hose having a given outer diameter, said clamp comprising a clamp wall forming a cuff having a longitudinal axis and longitudinal edges in said clamp wall, said longitudinal edges substantially facing each other to form a longitudinal gap, said clamp wall forming said cuff having an inherent biasing spring force component directed for biasing said longitudinal edges toward each other to form an inner cuff diameter tightly fitting onto said outer diameter in an installed condition of said cuff on said protection hose, and means for temporarily applying a gap widening force to said cuff to increase said inner cuff diameter against said biasing spring force component for inserting said protection hose into said cuff, whereby said biasing spring force component clamps said cuff onto said outer diameter of said protection hose when said gap widening force is released, wherein said clamp wall has a clamp wall thickness (D) that varies around said cuff from one of the longitudinal edges of said gap to the other of the longitudinal edges of said gap so that said clamp wall is thickest opposite said gap and thinnest next to said longitudinal edges of said gap and the thickest of said clamp wall thickness ($D_{MAX}$) is located where said gap widening force exerts a maximum bending moment.

2. The clamp of claim 1, wherein said clamp wall has a rectangular cross-section in a radial plane passing longitudinally through said longitudinal axis, said clamp wall further comprising two flanges each extending outwardly from a respective one of said longitudinal edges, said flanges extending in parallel to each other and facing each other across said gap, and wherein said means for temporarily applying said gap widening force comprise a threaded hole in one of said flanges and a threaded tool for screwing into said threaded hole so that said threaded tool can bear against the other of said flanges for widening said gap.

3. The clamp of claim 2, wherein said threaded tool for temporarily applying said gap widening force comprises a handle and a threaded shank for engaging said threaded hole, said threaded shank having a free end for bearing against said other flange of said two flanges to widen said gap (G).

4. The clamp of claim 2, wherein said threaded hole accepts a ground connector for grounding said clamp and said protection hose.

5. The clamp of claim 1, wherein said varying clamp wall thickness provides said cuff with an uniform bending resistance around said cuff from one longitudinal gap edge of said gap edges to the other longitudinal gap edge of said gap edges relative to said gap widening force, and wherein said inherent biasing spring force component of said clamp wall is also uniform around said cuff to form a substantially circular opening having said inner cuff diameter.

6. A clamp for securing a flexible protection hose to an electrical connector, said hose having a given outer diameter said clamp comprising a clamp wall forming a cuff having a longitudinal axis and longitudinal edges in said clamp wall, said longitudinal edges substantially facing each other to form a longitudinal gap, said clamp wall forming said cuff having an inherent biasing spring force component directed for biasing said longitudinal edges toward each other to form an inner cuff diameter tightly fitting onto said outer diameter in an installed condition of said cuff on said protection hose, and means for temporarily applying a gap widening force to said cuff to increase said inner cuff diameter against said biasing spring force component for inserting said protection hose into said cuff, whereby said biasing spring force component clamps said cuff onto said outer diameter of said protection hose when said gap widening force is released, wherein said clamp wall comprises a rolled-up spring forming said cuff, said rolled-up spring comprising an incomplete turn for leaving said gap open when said gap widening force is applied, and wherein said means for applying said gap widening force comprises a first opening positioned in said clamp wall next to one of said longitudinal edges and approximately midway between ends of said cuff and a second opening positioned in said clamp wall next to the other of said longitudinal edges and circumferentially opposite said first opening for insertion of a gap widening tool into said first and second openings to widen said gap by displacing said longitudinal edges away from each other.

7. A clamp for securing a flexible protection hose to an electrical connector, said hose having a given outer diameter, said clamp comprising a clamp wall forming a cuff having a longitudinal axis and longitudinal edges in said clamp wall, said longitudinal edges substantially facing each other to form a longitudinal gap, said clamp wall forming said cuff having an inherent biasing spring force component directed for biasing said longitudinal edges toward each other to form an inner cuff diameter tightly fitting onto said outer hose diameter in an installed condition of said cuff on said protection hose, and means for temporarily applying a gap widening force to said cuff to increase said inner cuff diameter against said biasing spring force component for inserting said protection hose into said cuff, whereby said biasing spring force component clamps said cuff onto said outer diameter of said protection hose when said gap widening force is released, and wherein said clamp wall comprises a rolled-up spring including more than one turn so that said longitudinal edges are radially displaced relative to each other and a portion of a rolled-up spring turn passes through said longitudinal gap (G), and wherein one of said longitudinal edges is positioned radially outwardly of said spring turn portion while the other of said longitudinal edges is positioned radially inwardly of said spring turn portion, a first opening positioned in said clamp wall next to said radially inwardly positioned longitudinal edge and a second opening positioned in said clamp wall next to said radially outwardly positioned longitudinal edge, said first and second openings being positioned circumferentially opposite each other, said more than one rolled-up spring turn comprising a cut-out for access to said first opening next to said radially inwardly positioned longitudinal edge, while the second opening located next to said radially outwardly positioned longitudinal edge is directly accessible for said tool.

8. The clamp of claim 7, further comprising two lugs secured to said more than one spring turn next to said longitudinal edges approximately midway between said ends of said cuff, said first and second openings being positioned in said lugs, and wherein one of said lugs passes through said cut-out.

9. The clamp of claim 8, wherein at least one of said lugs forms a grounding connector.

10. The clamp of claim 9, wherein said openings are through-holes through said lungs.

11. The clamp of claim 7, wherein said inherent biasing spring force component is directed for causing said more than one rolled-up spring turn to curl-up to narrow or eliminate said gap.

12. A clamp for securing a flexible protection hose to an electrical connector, said hose having a given outer diameter, said clamp comprising a clamp wall forming a cuff having a longitudinal axis and longitudinal edges in said clamp wall, said longitudinal edges substantially facing each other to form a longitudinal gap, said clamp wall forming said cuff having an inherent biasing spring force component directed for biasing said longitudinal edges toward each other to form an inner cuff diameter tightly fitting onto said outer diameter in an installed condition of said cuff on said flexible protection hose, and means for temporarily applying a gap widening force to said cuff to increase said inner cuff diameter against said biasing spring force component for inserting said flexible protection hose into said cuff, whereby said biasing spring force component clamps said cuff onto said outer diameter of said flexible protection hose when said gap widening force is released, and wherein said means for applying said gap widening force comprise two half shells positioned opposite each other across said gap and secured to a respective one of said longitudinal edges, said half shells forming cam surfaces for cooperation with a gap widening tool.

13. The clamp of claim 12, wherein at least one of said half-shells forms a grounding connector.

14. The clamp of claim 12, wherein each of said half-shells comprises a cover section for preventing said gap widening tool from slipping out of said half-shells, said cover sections facing each other and being spaced from each other sufficiently across said gap for insertion of said gap widening tool.

15. The clamp of claim 12, wherein said clamp wall has an uniform wall thickness from one longitudinal edge of said longitudinal edges to the other longitudinal edge of said longitudinal edges.

16. The clamp of claim 12, further comprising at least one corrugation groove in said clamp wall for strengthening said clamp wall.

17. The clamp of claim 16, wherein said at least one corrugation groove has an uniform radial depth along the length of said groove in a direction around said cuff.

18. The clamp of claim 16, wherein said at least one corrugation groove has a changing radial depth so that a largest groove depth is positioned opposite said gap and so that said groove depth diminishes toward said gap, whereby said clamp wall has an uniform bending resistance from one of the longitudinal edges to the other of the longitudinal edges around said cuff relative to a bending moment caused by said gap widening force.

* * * * *

UNITED STATES PATENT AND TRADEMARK OFFICE
CERTIFICATE OF CORRECTION

PATENT NO. : 5,814,763
DATED : Sep. 29, 1998
INVENTOR(S) : Kirma

It is certified that error appears in the above-identified patent and that said Letters Patent is hereby corrected as shown below.

On the Title Page,
under [56] References Cited, FOREIGN PATENT DOCUMENTS,
line 1, replace "Germany" by --German Democratic Republic--;

| Col. 7, | line 21, | after "diameter" insert --,--; |
|---|---|---|
| Col. 8, | line 22, | after "claim" replace "9," by --8,--; |
|  | line 23, | after "said" replace "lungs" by --lugs--; |
|  | line 51, | before "forms" replace "half-shells" by --half shells--; |
|  | line 52, | after "said" replace "half-" by --half--. |

Signed and Sealed this

Nineteenth Day of January, 1999

*Attest:*

*Attesting Officer*

*Acting Commissioner of Patents and Trademarks*